INVENTORS.
HIDEO SAEKI
FUMIO KONDO

BY *Kurt Kelman*

AGENT

United States Patent Office 3,445,731
Patented May 20, 1969

3,445,731
SOLID CAPACITOR WITH A POROUS ALUMINUM
ANODE CONTAINING UP TO 8% MAGNESIUM
Hideo Saeki and Fumio Kondo, Kawasaki-shi, Kanagawa,
Japan, assignors to Nippon Communication Industrial
Company Limited, Kawasaki-shi, Kanagawa, Japan
Filed Oct. 25, 1966, Ser. No. 589,280
Claims priority, application Japan, Oct. 26, 1965,
40/65,255
Int. Cl. H01g 9/04
U.S. Cl. 317—230
6 Claims

ABSTRACT OF THE DISCLOSURE

A porous anode of solid electrolytic capacitor comprises sintered particles of an alloy of 0.15% to 8% magnesium and 92% to 99.85% aluminum of at least 99.99% purity. This anode is made by comminuting the alloy into granular particles of 50 to 400 mesh, compacting the particles to a green density of 0.8 to 1.7 grams/cu. cm., and sintering the green compact. The particles have a plurality of facets and contiguously adjacent facets angularly meeting each other.

---

This invention relates to electrolytic capacitors, and particularly to an electrolytic capacitor having a solid electrolyte and a sintered anode mainly consisting of aluminum.

Capacitors of this type having sintered tantalum electrodes are widely used because of their reliability, low leakage current, and thermal stability. Tantalum, however, is very expensive and available from a limited number of sources only.

It has therefore been attempted to replace tantalum in solid electrolyte capacitors by other metals, particularly niobium, titanium, and aluminum. Niobium and titanium, however, are also expensive and capacitors made therefrom are inferior to tantalum capacitors. Aluminum is inexpensive, but the solid capacitors made heretofore from aluminum were much bulkier than tantalum capacitors of comparable capacity. Their manufacture, moreover, presented serious problems, making their unsuited for mass production.

An object of the invention is the provision of solid electrolyte capacitors having electrodes of sintered aluminum which are much smaller than those available heretofore at equal capacity, and which can be produced in large numbers without difficulty.

Another object is the provision of such a capacitor whose electrical characteristics are improved over those of aluminum capacitors available heretofore.

We have found that superior capacitors having a solid electrolyte can be made from sintered particles of an aluminum alloy containing more magnesium than is soluble in pure aluminum, that is, more than 0.15%, the remainder being pure aluminum (99.99%+). As much as 8% magnesium may be present in the alloy.

We have further found that a capacitor of more desirable characteristics is obtained from aluminum filings than from fine aluminum particles of other shapes. The filings are of angular, granular shape.

When the particles of relatively hard aluminum-magnesium alloy are mixed with a temporary binder, compressed to a green density of 0.8 to 1.7 grams per cubic centimeter, and sintered in an inert atmosphere or in a vacuum to 530±50° C., whereby the binder is volatilized, there is obtained an aluminum alloy body having a porosity of about 50 to 60 percent which may then be processed further in a manner conventional in itself to form a capacitor having superior characteristics.

Figure 1:
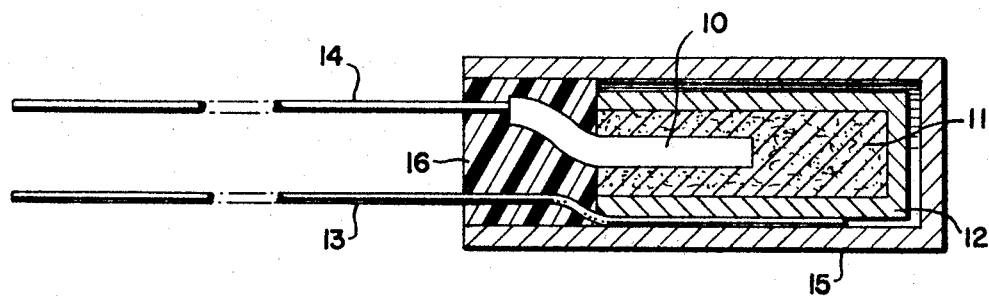
Figure 3:
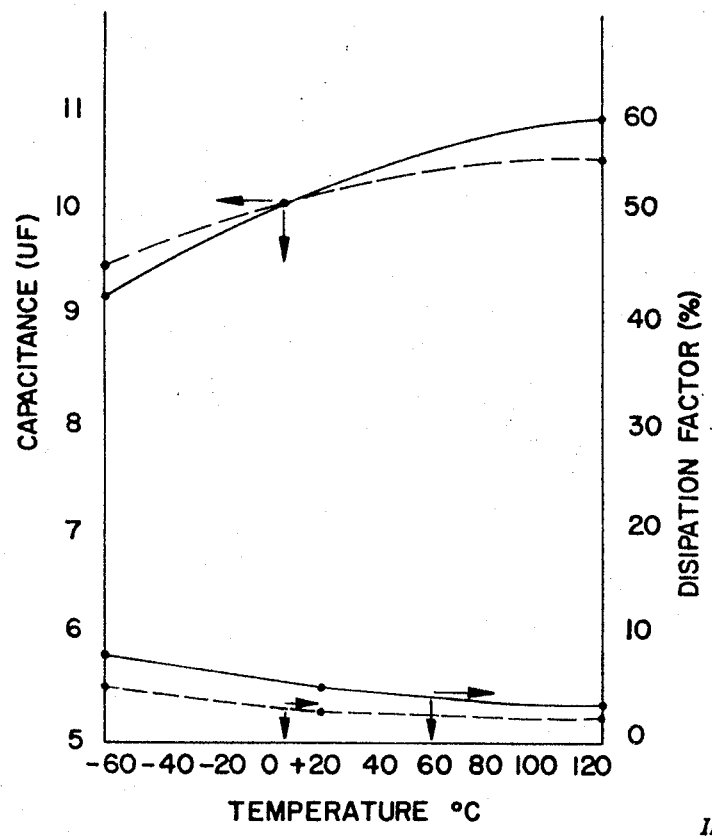
Figure 2:
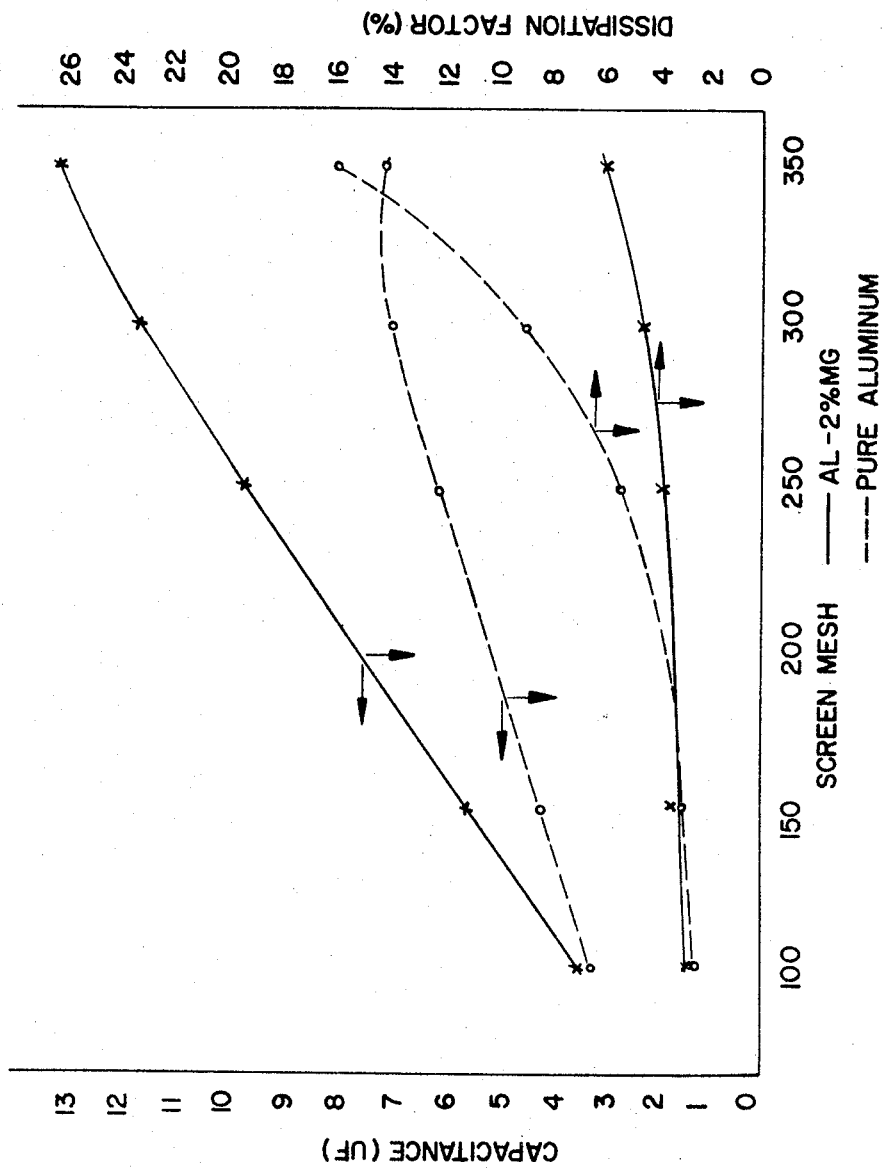

The exact nature of this invention as well as other objects and advantages thereof will be readily apparent from consideration of the following specification relating to the anexed drawings in which:

FIGURE 1 shows a cylindrical capacitor of the invention in axial section;

FIGURE 2 is a graph showing the influence of the original particle size of the electrode material on the capacitance and the dissipation factor of a capacitor of the invention and of an otherwise identical capacitor made of aluminum; and FIGURE 3 is a graph showing the temperature characteristics of a capacitor of this invention and of a similar tantalum capacitor, the solid line curves showing the capacitor of the invention and the broken line curves showing a sintered tantalum capacitor.

Referring initially to FIGURE 1, there is seen an aluminum wire 10, one end of which is embedded in a porous body or core 11 mainly consisting of aluminum-magnesium alloy. The core 11 is coated with a layer 12 of lead-tin solder. A conductive lead 14 is welded to the aluminum wire 10 and projects outward through an insulating plug 16 which closes the open end of a cup-shaped casing 15 which protects the body 11. Another lead 13 passes from the solder coating 12 through the plug 16.

The illustrated capacitor has an approximate volume of 0.75 cubic centimeter, a capacity of 10 microfarads at 25 volts, a series resistance of 6 to 7 ohms at 120 cycles, and a leakage current of 0.01 microampere at 25 volts.

The porous core 11 was prepared by comminuting a block of an aluminum alloy comprising of 2 percent magnesium, the remainder being aluminum of 99.99%+ purity. The block was fed to a milling cutter whose teeth acted like file teeth to produce the granular chips of desired configuration characterized by relatively small differences between the length, width, and height of each grain, the largest dimension being not substantially greater than 3 times the smallest dimension, and the grain having facets which were angularly offset from contiguously adjacent facets.

The chips were washed first in a mixture of nitric and hydrochloric acid to dissolve ferrous cutter particles and then in water to remove the acid and iron salts, dried, and screened to recover the fraction having a particle size of 50 to 400 mesh. 0.3 gram of the granular material were mixed with 4 percent camphor as a temporary binder and inserted in a cylindrical mold. The aluminum alloy grains were compacted to a green density of 1.28 grams per cubic centimeter, and the compact was then sintered in a vacuum at approximately 530° C.

The porous electrode obtained was cleaned, immersed in a conventional aqueous ammonium borate electrolyte, and anodized. It was then impregnated with a manganese nitrate solution and heated in air to about 400° C. until the development of nitric oxide fumes ceased which took a few minutes. The electrode which now had a manganese dioxide coating was then returned to the ammonium borate solution and anodized again for one-half of the original forming time at one-half of the original voltage, a conventional procedure commonly referred to as "healing." Coating with manganese dioxide and healing were repeated alternatingly several times.

The electrode was further coated with carbon and with solder, and assembled with the other elements shown in FIGURE 1 in the manner usual in the manufacture of solid capacitors having tantalum electrodes, and not requiring more detailed description.

Departures from the process conditions outlined above are permissible without losing all the benefits of this invention. The magnesium content of the alloy may be between 0.15% and 8%, but should be at least 2% to be fully effective. Alloys within this range have adequate hardness to prevent serious deformation of the grains during compacting which would reduce the porosity, and sufficient toughness to avoid spalling or splitting of the grains. The particle size may be between 50 mesh and 400 mesh.

The particle shape described above is important for producing the desired porosity. It is distinctly different from the shape obtained by atomizing, stamping or pulverizing. Atomized aluminum particles are globular and lack the characteristic edges of filings. Aluminum particles produced by stamping or pulverizing are plate or scale shaped, and pack even more densely than the atomized particles.

The compressing, sintering, and forming steps employed in preparing the capacitors of the invention are closely similar to or identical with corresponding steps in the conventional manufacture of aluminum or tantalum capacitors, and the influence of process variables is well understood so as not to require detailed discussion.

In the capacitors of the invention, the product of capacity and formation voltage in microfarad volts per gram is 4,000–8,000, whereas an otherwise similar capacitor made from atomized aluminum has a value of 1,000–2,800 microfarad volts, and stamped aluminum yields a value of only 500–1,000 microfarad volts.

When capacitors of the type illustrated were prepared from 99.99%+ aluminum and from an aluminum alloy containing 0.35% magnesium respectively under otherwise comparable conditions, it was found that the admixture of magnesium increased the capacitance from 25 to 50 microfarad per cubic centimeter, decreased the dissipation factor from 9% to 5%, and decreased the leakage current from 0.16 to 0.04 microampere per microfarad volt. These values are characteristic of the influence of magnesium as an alloying element.

FIGURE 2 shows the relationship of particle size prior to compacting and dissipation factor and capacitance for pure aluminum and for an aluminum alloy containing 2 percent magnesium. All sintered capacitor cores weighed 0.3 gram and had a green density of 1.28 grams per cubic centimeter. The capacitance and dissipation factor were measured for each capacitor at 120 cycles per second. It is evident from FIGURE 2 that the capacitance of the alloy capacitor is higher, and its dissipation factor lower than the corresponding properties of the pure aluminum capacitor over the entire range of original particle sizes, from 50 mesh to 400 mesh.

As is shown in FIGURE 3, the thermal stability of capacitance and dissipation factor in the aluminum alloy capacitors of the invention closely approaches that of a tantalum capacitor.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. In a solid electrolytic capacitor comprising anode and cathode electrodes, a dielectric separator arranged between the electrodes, and an electrolyte on the separator and contacting the cathode electrode, the improvement of the anode electrode being a porous body of metal particles sintered together, said particles being an alloy, by weight, of 0.15% to 8% magnesium and 92% to 99.85% aluminum of at least 99.99% purity.

2. A capacitor as set forth in claim 1, wherein said particles are granular, the largest of the dimensions of length, width, and height of substantially each particle being not substantially greater than 3 times the smallest one of said dimensions.

3. A capacitor as set forth in claim 2, wherein said alloy contains at least 2% magnesium.

4. A capacitor as set forth in claim 3, wherein said particles have a size of 50 to 400 mesh.

5. In a method of assembling anode and cathode electrodes with a dielectric separator arranged therebetween, and an electrolyte on the separator and contacting the cathode electrode, the improvement of producing the anode electrode by
   (a) comminuting a solid body of an alloy of 92% to 99.85%, by weight, aluminum and 0.15% to 8%, by weight, magnesium into granular particles of 50 to 400 mesh having a plurality of facets, contiguously adjacent facets angularly meeting each other;
   (b) compacting said particles in the presence of a temporary binder to a green density of 0.8 to 1.7 grams per cubic centimeter; and
   (c) sintering the green compact so obtained into a porous coherent body and removing the binder.

6. A method as set forth in claim 1, wherein said granular particles have dimensions of length, width, and height, the largest dimension of substantially each particle being not more than 3 times greater than the smallest dimension of said particle.

References Cited

UNITED STATES PATENTS

| | | | |
|---|---|---|---|
| 2,299,228 | 10/1942 | Gray et al. | 317—230 |
| 3,004,332 | 10/1961 | Werner | 317—230 |
| 3,166,693 | 1/1965 | Haring et al. | 317—230 |
| 3,302,073 | 1/1967 | Broodo | 317—230 |

JAMES D. KALLAM, *Primary Examiner.*

U.S. Cl. X.R.

29—570; 317—233